United States Patent
Kruppa et al.

(10) Patent No.: US 10,771,154 B2
(45) Date of Patent: Sep. 8, 2020

(54) METHOD FOR OPERATING A NON-TRACK-BOUND COLUMN OF VEHICLES AND DRIVER ASSISTANCE SYSTEM AND NON-TRACK BOUND COLUMN

(71) Applicant: KNORR-BREMSE SYSTEME FUER NUTZFAHRZEUGE GMBH, Munich (DE)

(72) Inventors: Philipp Kruppa, Groebenzell (DE); Andre Kluftinger, Kleinheubach (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/461,532

(22) PCT Filed: Nov. 13, 2017

(86) PCT No.: PCT/EP2017/079091
§ 371 (c)(1),
(2) Date: May 16, 2019

(87) PCT Pub. No.: WO2018/091420
PCT Pub. Date: May 24, 2018

(65) Prior Publication Data
US 2019/0355259 A1    Nov. 21, 2019

(30) Foreign Application Priority Data
Nov. 21, 2016  (DE) .................. 10 2016 122 325

(51) Int. Cl.
*H04B 10/112* (2013.01)
*H04W 4/46* (2018.01)
(Continued)

(52) U.S. Cl.
CPC ......... *H04B 10/1129* (2013.01); *B60W 30/16* (2013.01); *G05D 1/0293* (2013.01);
(Continued)

(58) Field of Classification Search
CPC ....... H04B 10/11–116; H04B 10/1129; H04W 4/46; B60W 30/16; B60W 2050/008; B60W 2556/65; G05D 1/0293; G08G 1/22
See application file for complete search history.

(56) References Cited

U.S. PATENT DOCUMENTS 5,680,122 A    10/1997  Mio
5,781,119 A     7/1998  Yamashita et al.
(Continued)

FOREIGN PATENT DOCUMENTS

DE           69621535 T2   1/2003
DE       102006058156 A1   6/2008
(Continued)

OTHER PUBLICATIONS

International Search Report dated Feb. 5, 2018, of the corresponding International Application PCT/EP2017/079091 filed Nov. 13, 2017.

*Primary Examiner* — Casey L Kretzer
(74) *Attorney, Agent, or Firm* — Norton Rose Fulbright US LLP; Gerard Messina

(57) ABSTRACT

A method for operating a non-track-bound convoy, the convoy having at least one vehicle traveling ahead and at least one vehicle that is contactlessly coupled to the vehicle traveling ahead and directly following the vehicle traveling ahead, in at least a largely automated manner, including: providing that the at least one vehicle directly following the vehicle traveling ahead follows the vehicle traveling ahead by at least largely automatic open-loop/closed-loop control;

(Continued)

and effecting a car-to-car communication between the vehicle traveling ahead and the at least one vehicle directly following the vehicle traveling ahead for the automatic open-loop/closed-loop control; in which a photo-optical, an optical-waveguide-less or an optical-fiber-less car-to-car communication is effected in each case between a light wave emitter and a light wave receiver for at least part of the car-to-car communication. Also described is a related driver assistance system and non-track bound convoy.

13 Claims, 1 Drawing Sheet

(51) Int. Cl.
*B60W 30/16* (2020.01)
*G05D 1/02* (2020.01)
*G08G 1/00* (2006.01)
*B60W 50/00* (2006.01)

(52) U.S. Cl.
CPC ............... *G08G 1/22* (2013.01); *H04W 4/46* (2018.02); *B60W 2050/008* (2013.01); *B60W 2556/65* (2020.02)

(56) References Cited

U.S. PATENT DOCUMENTS

| | | | |
|---|---|---|---|
| 2008/0187318 A1* | 8/2008 | Osanai | H04B 10/1141 398/129 |
| 2014/0309836 A1 | 10/2014 | Ollis | |
| 2015/0023668 A1 | 1/2015 | Spaulding et al. | |
| 2015/0065060 A1* | 3/2015 | Stahlin | B60Q 1/0017 455/73 |

FOREIGN PATENT DOCUMENTS

| | | |
|---|---|---|
| DE | 10201408659 A1 | 3/2015 |
| EP | 0762364 A2 | 3/1997 |
| EP | 3091520 A1 | 11/2016 |
| WO | 2016/178613 A1 | 11/2016 |

\* cited by examiner

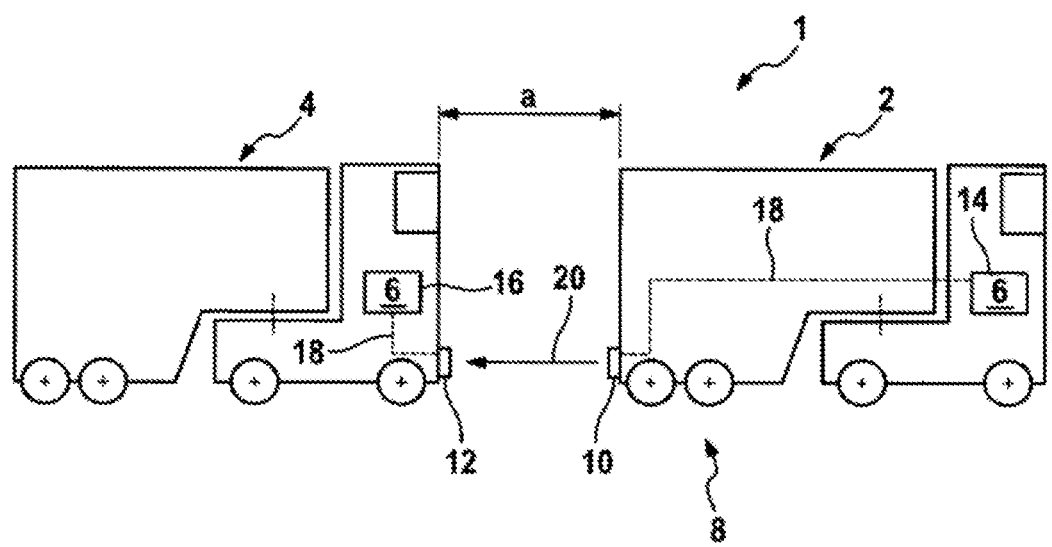

METHOD FOR OPERATING A NON-TRACK-BOUND COLUMN OF VEHICLES AND DRIVER ASSISTANCE SYSTEM AND NON-TRACK BOUND COLUMN

FIELD OF THE INVENTION

The present invention relates to a method for operating a non-track-bound convoy, consisting of at least one vehicle traveling ahead and at least one vehicle that is contactlessly coupled to the vehicle traveling ahead and directly follows the vehicle traveling ahead, in at a least largely automated manner, wherein the at least one vehicle directly following the vehicle traveling ahead follows the vehicle traveling ahead by at least largely automatic open-loop/closed-loop control, and wherein a car-to-car communication between the vehicle traveling ahead and the at least one vehicle directly following the vehicle traveling ahead is effected for this automatic open-loop/closed-loop control.

The invention also relates to a driver assistance system in which a car-to-car communication device is used to keep at least one vehicle within a non-track-bound convoy that is operated in at least largely automated manner, according to the preamble of claim 9, and to a non-track-bound convoy, consisting of at least one vehicle traveling ahead and at least one vehicle that is contactlessly coupled to the leading vehicle and directly follows the vehicle traveling ahead, that is operated in at least largely automated manner.

BACKGROUND INFORMATION

A method and/or a driver assistance system and a non-track-bound convoy are discussed in EP 3 091 520 A1.

It is believed to be understood to electronically couple multiple non-track-bound vehicles to one another such that they can travel in succession in largely automated manner at an almost constant, short distance. The distances between respective vehicles traveling in direct succession can in this case be chosen such that the vehicles act similarly to a convoy. At least the second vehicle and the further vehicles in the convoy each have a longitudinally guiding driver assistance system that is active during convoy travel. The vehicles of the convoy are controlled with one another by an electronic control and the longitudinally guiding driver assistance systems such that this automated travel state can be realized without risk.

This type of electronic coupling of vehicles, or this type of control of vehicles, is also described by the terms "platooning", "automatic convoy travel", "electronic drawbar" or "road train" in the literature. This can achieve better utilization of the road by virtue of shorter distances between the individual vehicles, a continuous flow of traffic with a lower number or regularity of queues, a lower energy consumption as a result of the aerodynamically beneficial utilization of slipstreams and strain relief for the drivers.

This requires all of the vehicles traveling in the convoy to have the appropriate driver assistance and control systems and also car-to-car communication (C2C). C2C communication stands for car-to-car communication and denotes communication of vehicles among one another. That is to say that the vehicles communicate among one another in order to clarify which vehicle is to follow which vehicle. When traveling in a convoy, the first vehicle or leading vehicle prescribes the speed and direction of travel, and further vehicles follow at a short distance. As a result of the vehicles being networked by car-to-car communication (C2C), they react more quickly in the event of braking maneuvers and can thus keep at a shorter distance from one another than usual.

Using car-to-car communication (C2C), the vehicles involved in traveling in a convoy communicate the control commands and information. In particular, the control commands and information required for the convoy travel mode are passed from the leading vehicle to the following vehicles. Vehicles following the leading vehicle also return data to the leading vehicle. However, the WLAN communication devices based on IEEE 802.11p, or ITS-G5, for which provision is usually made for this purpose are in an as yet incomplete optimization and standardization process with regard to the specific requirements for applications in vehicle safety systems though. Technological challenges for these WLAN communication devices arise particularly as a result of the frequency range used at 5.9 GHz. At this frequency, the attenuation of the signal by the cable used is relatively great. Additionally, the propagation properties of the emitted electromagnetic wave are highly dependent on the location of the arrangement of the antenna.

The demands placed by vehicle systems such as automatic convoy travel on the communication between the vehicles are significantly increased from the point of view of functional safety.

The invention is, by contrast, based on the object of developing a method and a driver assistance system and also a convoy of the type mentioned at the outset such that a high level of security is achieved at low cost.

This object is achieved according to the invention by the features as described herein.

SUMMARY OF THE INVENTION

The invention sets out from a method for operating a non-track-band convoy, consisting of at least one vehicle traveling ahead and at least one vehicle that is contactlessly coupled to the vehicle traveling ahead and directly follows the vehicle traveling ahead, in at least largely automated manner, wherein the at least one vehicle directly following the vehicle traveling ahead follows the vehicle traveling ahead by at least largely automatic open-loop/closed-loop control, and wherein a car-to-car communication between the vehicle traveling ahead and the at least one vehicle directly following the vehicle traveling ahead is effected for this automatic open-loop/closed-loop control.

The invention also sets out from a driver assistance system in which a car-to-car communication device is used to keep at least one vehicle within a non-track-bound and non-tactile convoy operated in at least largely automated manner that consists of a vehicle traveling ahead and at least one vehicle that is contactlessly coupled to the vehicle traveling ahead and directly follows the vehicle traveling ahead, wherein the at least one vehicle directly following the vehicle traveling ahead follows the vehicle traveling ahead by at least largely automatic open-loop/closed loop control. The function of this driver assistance system is thus exclusively or partly open-loop/closed-loop control of the non-tactile convoy travel function. In particular, the open-loop/closed-loop control routines relating to the non-tactile convoy travel function may be integrated in a separate control unit or in a control unit of another driver assistance system, wherein each of the vehicles taking part in the convoy may be equipped with such a control unit.

The invention also sets out from a non-track-bound convoy, consisting of at least one vehicle traveling ahead and at least one vehicle that is contactlessly coupled to the leading vehicle and directly follows the vehicle traveling ahead, that is operated in at least largely automated manner, wherein the at least one vehicle directly following the vehicle traveling ahead follows the vehicle traveling ahead by at least largely automatic open-loop/closed-loop control, and wherein there is provision for a car-to-car communication between the vehicle traveling ahead and the at least one vehicle directly following the vehicle traveling ahead for this automatic open-loop/closed-loop control.

The invention is thus the function of at least largely automated, non-track-bound convoy travel with non-tactile coupling of at least two vehicles. The vehicles may be any motor vehicles, in particular both passenger motor vehicles (PMVs) and trucks (HGVs). More than two motor vehicles as members of the convoy are also possible. Multiple or all vehicles may move in the same lane as a convoy. The vehicle traveling ahead can also be referred to as the leading vehicle.

In at least largely automated manner means that not all functions relating to convoy travel, the non-tactile, non-track-bound coupling of at least two vehicles, need to be fully automated, but can be. Actions from outside, for example by the driver, are also conceivable, for example.

According to the method of the invention, there is then provision that a photo-optical, optical-waveguide-less or optical-fiber-less car-to-car communication, effected in each case between a light wave emitter and a light wave receiver, is used for at least part of the car-to-car communication.

According to the driver assistance system of the invention, at least part of the car-to-car communication device is provided for as a photo-optical, optical-waveguide-less or optical-fiber-less car-to-car communication device in which the contactless communication is effected in each case between a light wave emitter and a light wave receiver.

According to the non-track-bound convoy of the invention, at least part of the car-to-car communication is provided for as photo-optical, optical-waveguide-less or optical-fiber-less car-to-car communication in which the contactless car-to-car communication is effected in each case between a light wave emitter and a light wave receiver.

In other words, the car-to-car communication is admittedly effected in photo-optical manner, i.e. by light signals that are emitted by a light wave emitter and received by a light wave receiver and then evaluated. However, the light signals are transmitted between the vehicles of the convoy without any use of optical waveguides or optical fibers or further tangible connections drawn between the vehicles and hence "wirelessly" in the free space (air) between the vehicles. The photo-optical car-to-car communication takes place between directly successive vehicles of the convoy in this case, since otherwise light signals are concealed by a vehicle traveling in between.

The light signals are transmitted under a modulated light signal protocol. This may involve light signals modulated by an electro-optical modulator (EOM) e.g. by amplitude modulation and/or frequency modulation being generated, said light signals being output into the free space (air) between directly successive vehicles of the convoy by the light wave emitter, received by the light wave receiver and for example evaluated by evaluation electronics in the form of an electro-optical demodulator. The light wave emitter and the electro-optical modulator (EOM) and also the light wave receiver and the electro-optical demodulator are for example connected in each case by an optical-waveguiding connection that transmits the light signals.

It is advantageous in this case that a photo-optical C2C communication is representable by light signals less expensively than for example a radio connection via WLAN. Furthermore, photo-optical C2C communication relatively immune to external interfering influences, since the optical transmission link in the case of convoy travel is relatively short. Additionally, the photo-optical C2C communication has a shorter latencies in comparison with WLAN solutions.

Finally, a C2C communication that is redundant for the purposes of increased functional safety can also be realized if there is provision for a radio-based C2C communication, e.g. by WLAN, in addition to the photo-optical C2C communication.

The measures presented in the descriptions herein allow advantageous developments and improvements of the invention specified herein.

Particularly, the photo-optical communication may be effected by light in the infrared range and/or in the ultraviolet range. So as not to disturb other road users as a result of the photo-optical communication between the vehicles, the photo-optical communication thus may take place in the range of invisible light (infrared, ultraviolet) or in the range of visible light, but in that case at a clock frequency of greater than 30 Hz. Such light is detected as a permanently shining light source by the eye. A combination of the two light spectra (infrared, ultraviolet and visible light) is also conceivable in order to increase the transmission bandwidth.

Particularly, the light wave emitter and the light wave receiver may be arranged on a vehicle rear of the vehicle traveling ahead and on a vehicle front of the vehicle directly following the vehicle traveling ahead, wherein the light wave emitter can be arranged on the vehicle traveling ahead and the light wave receiver can be arranged on the vehicle directly following the vehicle traveling ahead, or vice versa.

According to one development, the photo-optical communication between the vehicle traveling ahead and the at least one vehicle directly following the vehicle traveling ahead can be effected unidirectionally or bidirectionally.

In the case of a bidirectional photo-optical communication between a vehicle traveling ahead and a directly following vehicle, light signals are emitted by the vehicle traveling ahead by at least one light wave emitter arranged thereon and are received and evaluated by the directly following vehicle by at least one light wave receiver arranged thereon. Furthermore, light signals are also emitted by the directly following vehicle by at least one light wave emitter arranged thereon and are received by the vehicle traveling ahead by at least one light wave receiver arranged thereon and are evaluated in evaluation electronics.

In the case of a unidirectional photo-optical communication, light signals may be emitted by the vehicle traveling ahead by at least one light wave emitter arranged thereon and are received and evaluated by the following vehicle by a light wave receiver arranged thereon. However, the opposite direction in regard to emission and reception of light signals is also conceivable.

Simply by using a unidirectional photo-optical communication, driver assistance systems such as emergency brake assistant systems can be improved by virtue of information about deceleration, vehicle speed, about braking processes, road condition, etc. being transmitted in a light signal protocol. As such, e.g. during braking, the directly following vehicle can be controlled in response to the deceleration of the vehicle traveling ahead.

The light wave emitter used or provided for may be at least one LED (light-emitting diode) and/or at least one laser diode (LD), and the light wave receiver used or provided for is at least one photodiode. In this case, the light wave emitter and the light wave receiver may be partially or fully integrated either separately on the vehicle rear and/or on the vehicle front or else in headlamps, taillights or brake lights.

The light wave emitter used or provided for may be a light wave emitter intended for at least one further purpose, other than the photo-optical communication, or a separate light wave emitter intended merely for the photo-optical communication.

Furthermore, the light wave receiver used or provided for may also be a light wave receiver intended for at least one further purpose, other than the photo-optical communication, or a separate light wave receiver intended merely for the photo-optical communication.

The light wave emitter used or provided for that is intended for the at least one further purpose, other than the photo-optical communication, may be a brake light, a clearance lamp or a daytime running light of a vehicle. Furthermore, the light wave receiver used or provided for that is intended for the at least one further purpose, other than the photo-optical communication, may be a camera or a light/rain sensor. Such a camera may in particular already be intended for a driver assistance system with a different function than the convoy travel function, e.g. detection of road signs, of stationary or moving objects. A light/rain sensor is used for switching on and off a low beam of a vehicle depending on the brightness of the surroundings and for switching on and off a windshield wiper of a vehicle depending on the rain content of the ambient air.

A communication other than a photo-optical communication, such as for example a radio-based communication, can be used or provided for in addition to the photo-optical communication between the vehicle traveling ahead and the at least one vehicle directly following the vehicle traveling ahead. This results in a redundant communication, namely firstly photo-optical and secondly radio-based (electromagnetic waves), which means that this increases functional safety.

Further measures improving the invention are depicted in more detail below together with the description of an exemplary embodiment of the invention on the basis of the drawing.

BRIEF DESCRIPTION OF THE DRAWING

The FIGURE depicts an exemplary embodiment of the invention, and schematically shows a convoy of vehicles that is operated according to an exemplary embodiment of a method according to the invention and of a driver assistance system according to the invention.

DETAILED DESCRIPTION

The FIGURE schematically depicts a non-track-bound, automatically operated convoy 1 having in this case just two vehicles, a first vehicle (leading vehicle) 2 and a directly following second vehicle 4 within the convoy. It goes without saying that the convoy 1 is not limited to the depicted number of two vehicles 2, 4. The convoy 1 has at least two vehicles, but the maximum number of vehicles is fundamentally not restricted.

The FIGURE depicts the convoy 1 formed from trucks 2, 4 with a semitrailer each. It goes without saying that the present invention is not restricted to convoys 1 formed from trucks 2, 4. It is fundamentally possible for all motor vehicle types (passenger motor vehicles, trucks, buses, military vehicles of all types, motorcycles, etc.) to form a non-track-bound, automatically operated convoy 1 if they each have the appropriate driver assistance system. It goes without saying that there may also be different vehicle types present within a non-track-bound, automatically operated convoy 1.

In the case of the non-track-bound automatically operated convoy 1 depicted, the second vehicle 4, which directly follows the first leading vehicle 2, is coupled to the leading vehicle 2 in automated and contactless (non-tactile) manner. Further vehicles, not shown here, in the automatically operated convoy 1 are also coupled to the respective vehicle traveling ahead and/or to the respective directly following vehicle in contactless (non-tactile) manner as far as the last vehicle in the convoy 1, which is coupled to the penultimate vehicle in the convoy 1 in contactless (non-tactile) manner.

The vehicles 2 following the first leading vehicle 1 traveling ahead follow the leading vehicle 1 in at least largely automatically controlled manner. To this end, at least the following vehicles 2 have the necessary sensor systems, driver assistance systems and control devices for automatic open-loop and closed-loop control of speed, steering, lane keeping, braking, etc. For a relatively long time now, longitudinally guiding driver assistance systems for vehicles have been known that use suitable braking and acceleration interventions to control the distance, usually in the form of a time gap, in response to a vehicle traveling ahead. The best known representatives of such driver assistance systems, which are also referred to as distance control systems, are ACC (adaptive cruise control) systems. A common feature of such systems is that at least one sensor, in particular a radar sensor and/or a video camera, can be used to obtain information about the distance and the speed of a motor vehicle traveling directly ahead, the distance control then being based on said information. In the case of ACC systems, this functionality is combined with automatic speed control. The automated non-track-bound convoy travel with non-tactile coupling of at least two vehicles function controls or regulates the distance between the first leading vehicle 1 traveling ahead and the directly following second vehicle 2 or between vehicles traveling directly behind one another to achieve a prescribed (minimum) distance a.

The manner in which automated, non-track-bound convoy travel with non-tactile coupling of at least two vehicles 2, 4 can be accomplished is thus known to a person skilled in the art from a multiplicity of patent publications.

In the present case, the function of automated, non-track-bound convoy travel with non-tactile coupling of at least two vehicles 2, 4 is provided within the framework of a driver assistance system, wherein the function of this driver assistance system consists exclusively or partly in the open-loop/closed-loop control of the function of the non-tactile coupling/convoy travel of at least two vehicles 2, 4. In particular, the open-loop/closed-loop control routines relating to the function of the non-tactile coupling of at least two vehicles 2, 4 may be integrated in a separate electronic control unit 6 or in an electronic control unit of another driver assistance system, wherein each of the vehicles 2, 4 participating in the convoy 1 may be equipped with an electronic control unit 6 of this kind.

The driver assistance system has a photo-optical car-to-car communication device that is used to accomplish the above-described function of automated, non-track-bound convoy travel with non-tactile coupling of at least two vehicles by data interchange between the vehicles involved in the convoy.

The photo-optical car-to-car communication device in the present case is a photo-optical optical-waveguide-less or optical-fiber-less communication device 8 that involves the communication being effected in each case between a light wave emitter 10 and a light wave receiver 12. The light signals are transmitted under a modulated light signal protocol. In this case, light signals 20 modulated by an electro-optical modulator (EOM) 14 e.g. by amplitude modulation and/or frequency modulation are generated that are output into the free space (air) between the successive vehicles 2, 4 of the convoy 1 by the light wave emitter 10, received by the light wave receiver 12 and evaluated by evaluation electronics in the form of an electro-optical demodulator 16. In the exemplary embodiment of the FIGURE, the electro-optical modulator (EOM) 14 is for example integrated in the electronic control unit 6 of the first leading vehicle 2 and the electro-optical demodulator 16 is integrated in the electronic control unit 6 of the second, directly following vehicle 4. Between the electro-optical modulator (EOM) 14 and the light wave emitter 10 and between the electro-optical demodulator 16 and the light wave receiver 12, there is then for example in each case an optical-waveguiding connection 18, for example by virtue of optical waveguides or optical fibers.

In the exemplary embodiment shown in the FIGURE, unidirectional photo-optical communication between the first vehicle 2 traveling ahead and the directly following second vehicle 4 takes place by virtue of light signals being emitted by the first vehicle 2 traveling ahead, by the at least one light wave emitter 10 arranged thereon, and then being received and evaluated by at least one light wave receiver 12 on the second, directly following vehicle 4. In the embodiment shown in exemplary manner in the present case, the electro-optical modulator (EOM) 14 is thus arranged together with the at least one light wave emitter 10 on the first vehicle 2 traveling ahead, and the at least one light wave receiver 12 and the electro-optical demodulator 16 are arranged on the second, directly following vehicle 4.

The first vehicle 2 traveling ahead may have provision for at least one LED (light-emitting diode) and/or at least one laser diode (LD) as the light wave emitter 10, and the second, directly following second vehicle 4 has provision for at least one photodiode as the light wave receiver 12. In this case, the light wave emitter 10 is arranged for example separately on the vehicle rear, in the present case for example on the rear of the semitrailer of the first vehicle 2 traveling ahead, and the light wave receiver 12 is arranged for example on the vehicle front of the second, directly following vehicle 4. The light wave emitter 10 and the light wave receiver 12 may each be provided for and arranged separately or else may be partially or fully integrated in headlamps, tail lights or brake lights.

Alternatively, the light wave receiver 12 and/or the light wave emitter 10 provided for can be a light wave receiver and/or light wave emitter intended for at least one further purpose, other than the photo-optical communication. A brake light, a daytime running light or a clearance lamp of the first vehicle 2 traveling ahead may be provided for as the light wave emitter 10 intended for the at least one further purpose, other than the photo-optical communication. Furthermore, a camera or a light/rain sensor may be provided for as the light wave receiver 12 of the second, directly following vehicle 4 that is intended for the at least one further purpose, other than the photo-optical communication. Such a camera may in particular already be intended for a driver assistance system with a different function than the convoy travel function, e.g. detection of road signs, of stationary or moving objects. A light/rain sensor is used for switching on and off a low beam of the second vehicle 4 depending on the brightness of the surroundings or for switching on and off a windshield wiper of the second vehicle 4 depending on the rain content of the ambient air.

In this case, as departed from the FIGURE, this camera and/or the rain sensor may then be arranged on or in the driver's cab.

Alternatively, there could also be provision for bidirectional photo-optical communication between the two vehicles 2, 4, in which case there is then provision on both vehicles 2, 4 for light wave emitters 10 and light wave receivers 12 and also electro-optical modulators (EOM) 14 and electro-optical demodulators 16.

The invention is not restricted to the embodiments described merely in exemplary manner, but rather includes any combination of single features described above.

The List of reference signs is as follows:
1 Convoy
2 First vehicle
4 Second vehicle
6 Control unit
8 Photo-optical communication device
10 Light wave emitter
12 Light wave receiver
14 Electro-optical modulator
16 Electro-optical demodulator
18 Optical-waveguiding connection
20 Light signal
a Distance

The invention claimed is:

1. A method for operating a non-track-bound convoy, the method comprising:
providing that at least one vehicle, which is directly following a vehicle traveling ahead, follows the vehicle traveling ahead by an automatic open-loop/closed-loop control, wherein the convoy has the at least one vehicle traveling ahead and the at least one vehicle that is contactlessly coupled to the vehicle traveling ahead and directly following the vehicle traveling ahead, in an automated manner; and
effecting a car-to-car communication between the vehicle traveling ahead and the at least one vehicle directly following the vehicle traveling ahead for the automatic open-loop/closed-loop control;
wherein a photo-optical, an optical-waveguide-less or an optical-fiber-less car-to-car communication is effected in each case between a light wave emitter and a light wave receiver for at least part of the car-to-car communication,
wherein the automatic open-loop/closed-loop control is for speed, steering, lane keeping, and braking, and includes at least an adaptive cruise control ("ACC") system,
wherein light signals modulated by an electro-optical modulator are generated, output into a free space between two directly successive vehicles of the convoy by the light wave emitter, received by the light wave receiver, and evaluated by an electro-optical demodulator,
wherein the at least one electro-optical modulator is integrated in an electronic control unit of the vehicle traveling ahead and the electro-optical demodulator is integrated in an electronic control unit of the at least one vehicle directly following the vehicle traveling ahead,
wherein the photo-optical communication between the vehicle traveling ahead and the at least one vehicle directly following the vehicle traveling ahead is provided bidirectionally, and wherein a combination of at least two light spectra, including infrared, ultraviolet and/or visible light, is used in the photo-optical communication to increase a transmission bandwidth.

2. The method of claim 1, wherein the photo-optical communication is effected by light in the infrared range and/or in the ultraviolet range.

3. The method of claim 1, wherein the light wave emitter includes at least one light-emitting diode (LED) and/or a laser diode (LD), and the light wave receiver includes at least one photodiode.

4. The method of claim 1, wherein the light wave emitter is intended for at least one further purpose, other than the photo-optical communication, or a separate light wave emitter intended merely for the photo-optical communication, and wherein the light wave receiver includes a light wave receiver intended for at least one further purpose, other than the photo-optical communication, or a separate light wave receiver intended merely for the photo-optical communication.

5. The method of claim 4, wherein the light wave emitter that is intended for the at least one further purpose, other than the photo-optical communication, includes a brake light and/or a clearance lamp and/or a daytime running light, and wherein the light wave receiver that is intended for the at least one further purpose, other than the photo-optical communication, includes a camera and/or a light/rain sensor.

6. The method of claim 1, wherein a communication other than a photo-optical communication is effected in addition to the photo-optical communication between the vehicle traveling ahead and the at least one vehicle directly following the vehicle traveling ahead.

7. A driver assistance system, comprising:
a car-to-car communication device to keep at least one vehicle within a non-track-bound convoy operated in an automated manner, the convoy including a vehicle traveling ahead and at least one vehicle that is contactlessly coupled to the vehicle traveling ahead and directly following the vehicle traveling ahead; and
an automatic open-loop/closed loop control to provide that the at least one vehicle directly follows the vehicle traveling ahead;
wherein at least part of the car-to-car communication device is provided for as a photo-optical, an optical-waveguide-less or an optical-fiber-less car-to-car communication device in which the communication is effected in each case between a light wave emitter and a light wave receiver, and
wherein the automatic open-loop/closed-loop control is for speed, steering, lane keeping, and braking, and includes at least an adaptive cruise control ("ACC") system,
wherein the car-to-car communication device includes at least one electro-optical modulator, wherein the at least one electro-optical modulator generates modulated light signals that are output into the free space between two directly successive vehicles of the convoy by the light wave emitter, received by the light wave receiver, and evaluated by the at least one electro-optical demodulator,
wherein the at least one electro-optical modulator is integrated in an electronic control unit of the vehicle traveling ahead and the electro-optical demodulator is integrated in an electronic control unit of the at least one vehicle directly following the vehicle traveling ahead, wherein the photo-optical communication between the vehicle traveling ahead and the at least one vehicle directly following the vehicle traveling ahead is provided bidirectionally, and
wherein a combination of at least two light spectra, including infrared, ultraviolet and/or visible light, is used in the photo-optical communication to increase a transmission bandwidth.

8. The driver assistance system of claim 7, wherein the photo-optical communication is provided by light in the infrared range and/or the ultraviolet range.

9. The driver assistance system of claim 7, wherein the light wave emitter includes at least one light-emitting diode (LED) and/or a laser diode (LD), and the light wave receiver includes at least one photodiode.

10. The driver assistance system of claim 7, wherein the light wave emitter includes a light wave emitter intended for at least one further purpose, other than the photo-optical communication, or a separate light wave emitter intended merely for the photo-optical communication, and in that the light wave receiver includes a light wave receiver intended for at least one further purpose, other than the photo-optical communication, or a separate light wave receiver intended merely for the photo-optical communication.

11. The driver assistance system of claim 10, wherein the light wave emitter that is intended for the at least one further purpose, other than the photo-optical communication, includes a brake light and/or a clearance lamp and/or a daytime running light, and wherein the light wave receiver that is intended for the at least one further purpose, other than the photo-optical communication, includes a camera and/or a light/rain sensor.

12. The driver assistance system of claim 7, wherein a communication other than a photo-optical communication is provided in addition to the photo-optical communication between the vehicle traveling ahead and the at least one vehicle directly following the vehicle traveling ahead.

13. A non-track-bound convoy, comprising:
at least one vehicle traveling ahead and at least one vehicle that is contactlessly coupled to the leading vehicle and directly following the vehicle traveling ahead, that is operated in an automated manner;
wherein the at least one vehicle directly following the vehicle traveling ahead follows the vehicle traveling ahead by an automatic open-loop/closed-loop control,
wherein there is car-to-car communication between the vehicle traveling ahead and the at least one vehicle directly following the vehicle traveling ahead for this automatic open-loop/closed-loop control,
wherein at least part of the car-to-car communication is provided for as a photo-optical, an optical-waveguide-less or an optical-fiber-less car-to-car communication in which the car-to-car communication is effected in each case between a light wave emitter and a light wave receiver,
wherein the automatic open-loop/closed-loop control is for speed, steering, lane keeping, and braking, and includes at least an adaptive cruise control ("ACC") system,
wherein light signals modulated by an electro-optical modulator are generated, output into a free space between two directly successive vehicles of the convoy by the light wave emitter, received by the light wave receiver, and evaluated by an electro-optical demodulator,
wherein the at least one electro-optical modulator is integrated in an electronic control unit of the vehicle traveling ahead and the electro-optical demodulator is integrated in an electronic control unit of the at least one vehicle directly following the vehicle traveling ahead, wherein the photo-optical communication between the vehicle traveling ahead and the at least one vehicle directly following the vehicle traveling ahead is provided bidirectionally, and wherein a combination of at least two light spectra, including infrared, ultraviolet and/or visible light, is used in the photo-optical communication to increase a transmission bandwidth.

\* \* \* \* \*